US006961362B2

(12) United States Patent
Ariyoshi et al.

(10) Patent No.: US 6,961,362 B2
(45) Date of Patent: Nov. 1, 2005

(54) COMMUNICATION METHOD AND ITS POWER CONTROL METHOD

(75) Inventors: Masayuki Ariyoshi, Tokyo (JP); Riaz Esmailzadeh, Kanagawa-ken (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 840 days.

(21) Appl. No.: 09/892,459

(22) Filed: Jun. 28, 2001

(65) Prior Publication Data

US 2002/0021682 A1   Feb. 21, 2002

(30) Foreign Application Priority Data

Jun. 30, 2000  (JP) .............................. 2000-198723

(51) Int. Cl.[7] .............................................. H04B 1/69
(52) U.S. Cl. ...................... 375/130; 375/136; 375/147; 375/148; 370/342; 455/522
(58) Field of Search ............................. 375/130, 135, 375/136, 140–142, 146–148, 220, 326, 346, 375/349; 370/252, 318, 332, 342, 335, 337, 370/311; 455/68–70, 552

(56) References Cited

U.S. PATENT DOCUMENTS

| | | | |
|---|---|---|---|
| 5,898,740 A | | 4/1999 | Laakso et al. |
| 6,137,788 A | * | 10/2000 | Sawahashi et al. .......... 370/342 |
| 6,529,482 B1 | * | 3/2003 | Lundby ....................... 370/252 |
| 6,529,741 B1 | * | 3/2003 | Tong et al. .................. 455/522 |

FOREIGN PATENT DOCUMENTS

EP       0863618 A2    9/1998

OTHER PUBLICATIONS

Alexandra Duel-Hallen et al., "Multiuser Detection for CDMA Systems", IEEE Personal Communications Apr. 1995, pp. 46-58.

Shimon Moshavi, Bellcore, "Multi-User Detection for DS-CDMA Communications", IEEE Communications Magazine Oct. 1996; pp. 124-136.

ETSI TS 125 214 V3.2.0 (Mar. 2002), "Universal Mobile Telecommunications System (UMTS); Physical layer procedures (FDD) (3G TS 25.214 version 3.2.0. Release 1999)".

* cited by examiner

Primary Examiner—Young T. Tse
Assistant Examiner—Edith Chang (57) ABSTRACT

The purpose of the present invention is to offer a structure of a CDMA system having a power control method and interference cancellers which can effectively increase the system capacity and is resistant to sudden changes on the communication path, and to achieve a power control method with a fast response capable of preventing unnecessary increases in the transmission power (and multiple access interference) of the uplink by reflecting the values of the post-interference cancellation signal-to-interference power ratio in the generation of power control command information. The invention is directed to a power control method in a communication system for performing communications by code-division multiple access between a mobile station and base station, wherein a multiple access interference signal contained in a reception signal from the mobile station is cancelled, a post-interference cancellation signal-to-interference power ratio of the reception signal currently received is estimated, a power control command is generated by comparing the estimated post-interference cancellation signal-to-interference power ratio and a target value for power control, and transmitting this power control command to the mobile station to control the transmission power of the mobile station.

12 Claims, 6 Drawing Sheets

COMMUNICATION METHOD AND ITS POWER CONTROL METHOD

BACKGROUND OF THE INVENTION

The present invention relates to a power control method used in a code-division multiple access (CDMA) format communication system, which is particularly suitable for application to a communication system having a multiple access interference (MAI) canceller capability.

Generally, in CDMA radio communication formats such as wideband CDMA (W-CDMA), each uplink from a mobile station (MS) to a base station (BS) has two power control systems known as the outer loop and the inner loop. The outer loop is a higher layer control for independently adjusting the target for uplink power control in each cell in an active group. Since the outer loop is based on measurement results of a block error rate (BLER) of decoded data, the control response is delayed by the transmission time interval (TTI) required for calculating the block error rate.

The inner loop, to which the present invention is primarily directed, makes minor adjustments of the mobile station transmission power to hold the signal-to-interference ratio (hereinafter referred to as SIR) of the uplink at a specific target. The inner loop power control of the uplink is performed by the following method (see 3rd Generation Partnership Project (3GPP) TS 25.214, v1.1.0, UTRA FDD Physical Layer Procedures):

(1) The base station receives a dedicated physical control channel (DPCCH) of an uplink, and measures the SIR value of the received signal.
(2) Next, the base station compares the measured SIR value to a target value for the signal-to-interference power ratio (hereinafter referred to as SIR target value), and determines a transmission power control (TPC) command for the uplink in order to control the transmitting power of the mobile station.
(3) The transmission power control command which has been determined in this way is next inserted into a predetermined position in the slot of the downlink (the communication in the direction from the base station to the mobile station) transmitted immediately after the slot which is currently being transmitted, and transmitted to the mobile station.
(4) The mobile station adjusts the transmission power of the uplink in accordance with the received transmission power control command.

Since response delays of the power control degrade the system performance, the inner loop of the power control format was performed for each slot period and SIR measurement was performed in real-time in conventional methods.

The interference canceller (IC) has been proposed as art for increasing system capacity by eliminating multiple access interference which occurs in CDMA communications. In base stations having such interference canceling capabilities, the multiple access interference components are subtracted from the received CDMA signals by means of an interference canceling unit (ICU) of each uplink channel. When a desired dedicated physical data channel (DPDCH) is demodulated at the base station, the multiple access interference components can be substantially removed from the received signal by means of an iterative interference subtractive operation of a multistage interference canceling unit. As a result, it is possible to improve the SIR vale of a desired dedicated physical data channel, thus further increasing the system capacity. This is explained in many technical papers and articles such as A. Duel-Hallen et al., "Multiuser Detection for CDMA Systems," IEEE Personal Communications, pp. 46–58, April 1995 and S. Moshavi, "Multi-user Detection for DS-CDMA Communications," IEEE Communications Magazine, pp. 124–136, October 1996.

In normal base stations having an interference canceling capability, SIR measurements of the dedicated physical control channel are made prior to interference cancellation. As a result, the measured SIR value is smaller than the SIR value of the dedicated physical data channel after interference cancellation, which is demodulated and decoded. For this reason, if transmission power control of the uplink is performed based on the SIR value prior to interference cancellation in accordance with the transmission power control method described above, there is a risk of the transmission power of the uplink being unnecessarily raised. In order to avoid this, one might conceive of performing transmission power control based on the SIR value after interference cancellation, but in this case, the power control is delayed because of the time required for the interference cancellation operation.

Additionally, the SIR target value used to determined the transmission power control command is determined by the outer loop based on the block error rate as described above. Since the block error rate is calculated from the results of a cyclic redundancy check (CRC), it cannot be calculated until the decoding operation (rate de-matching de-interleaving, channel decoding and CRC judgment) is completed with respect to the entire frame. Furthermore, in order to measure the block error rate (e.g. 20 ms–2 s), it is necessary to perform cyclic redundancy checks of a plurality of frames. Therefore, the SIR target values from the outer loop are delayed by the block error rate measurement.

This response delay in the power control is one factor in the degradation of the system capacity. This effect is particularly apparent when the state of the communication path suddenly changes, such as when connecting or terminating new channels (calls) or due to fast fading effects.

BRIEF SUMMARY OF THE INVENTION

The object of the present invention which has been made in view of the above considerations is to offer CDMA control method and a CDMA system structure having an interference canceller which can effectively increase the system capacity while simultaneously being capable of handling sudden changes in the communication path, and more specifically, to achieve a quickly responding power control method capable of suppressing unneeded increases in the transmission power (and multiple access interference) of the uplink by reflecting the SIR values after interference cancellation in the generation of power control command information.

According to a first aspect of the present invention, a communication system for performing code-division multiple access communications between a mobile station and a base station is such that the base station comprises base station receiving means for receiving signals from the mobile station and outputting a first reception signal; interference canceling means for canceling a multiple access interference signal contained in the first reception signal; interference cancellation effect estimating means for estimating a post-interference cancellation signal-to-interference power ratio of the first reception signal which is currently being received; control command generating means for generating a power control command by comparing the post-interference cancellation signal-to-interference power ratio determined by the interference cancellation effect estimating means with a target value for power control; and base station transmitting means for transmitting the power control command to the mobile station; and the mobile station comprises mobile station receiving means for receiving a signal from the base station and outputting a second reception signal; and mobile station transmitting means which adjusts the power of the transmission signal transmitted to the base station based on the power control command contained in the second reception signal.

According to a second aspect of the present invention, a communication system for performing code-division multiple access communications between a mobile station and a base station is such that the base station comprises base station receiving means for receiving signals from the mobile station and outputting a first reception signal; interference canceling means for canceling a multiple access interference signal contained in the first reception signal; error rate calculating means for decoding the first reception signal after interference cancellation by the interference canceling means and determining an error rate of the decoded data; first target value setting means for determining a target value for power control based on the error rate determined by the error rate calculating means; interference cancellation effect estimating means for estimating the effects of interference cancellation by the interference canceling means; second target value setting means for updating the target value depending on the interference cancellation effects estimated by the interference cancellation effect estimating means; control command generating means for generating a power control command by comparing the target value outputted from the second target value setting means with the signal-to-interference power ratio of the first reception signal which is currently being received; and base station transmission means for transmitting the power control command to the mobile station; and the mobile station comprises mobile station receiving means for receiving a signal from the base station and outputting a second reception signal; and mobile station transmitting means which adjusts the power of the transmission signal transmitted to the base station based on the power control command contained in the second reception signal.

According to a third aspect of the present invention, a base station device in a communication system for performing communications with a mobile station by code-division multiple access comprises base station receiving means for receiving signals from the mobile station and outputting a reception signal; interference canceling means for canceling a multiple access interference signal contained in the reception signal; interference cancellation effect estimating means for estimating a post-interference cancellation signal-to-interference power ratio of the reception signal which is currently being received; control command generating means for generating a power control command by comparing the post-interference cancellation signal-to-interference power ratio determined by the interference cancellation effect estimating means with a target value for power control; and base station transmitting means for transmitting the power control command to the mobile station.

According to a fourth aspect of the present invention, a base station device for a communication system for performing communications with a mobile station by code-division multiple access comprises base station receiving means for receiving signals from the mobile station and outputting a reception signal; interference canceling means for canceling a multiple access interference signal contained in the reception signal; error rate calculating means for decoding the reception signal after interference cancellation by the interference canceling means and determining an error rate of the decoded data; first target value setting means for determining a target value for power control based on the error rate determined by the error rate calculating means; interference cancellation effect estimating means for estimating the effect of the interference cancellation by the interference canceling means; second target value setting means for updating the target value depending on the interference cancellation effects estimated by the interference cancellation effect estimating means; control command generating means for generating a power control command by comparing the target value outputted from the second target value setting means with the signal-to-interference power ratio of the first reception signal which is currently being received; and base station transmitting means for transmitting the power control command to the mobile station.

According to a fifth aspect of the present invention a power control method in a communication system for performing communications by code-division multiple access between a mobile station and a base station comprises canceling a multiple access interference signal contained in a reception signal from the mobile station; estimating a post-interference cancellation signal-to-interference power ratio of the reception signal which is currently being received; generating a power control command by comparing the estimated post-interference cancellation signal-to-interference power ratio and a target value for power control; and controlling the transmission power of the mobile station by transmitting the power control command to the mobile station.

According to a sixth aspect of the present invention, a power control method in a communication system for performing communications by code-division multiple access between a mobile station and a base station comprises canceling a multiple access interference signal contained in a reception signal from the mobile station; decoding the reception signal after the interference cancellation and determining the error rate of the decoded data, determining a target value for power control based on the determined error rate, estimating the interference cancellation effect due to the interference cancellation, and updating the target value depending on the estimated interference cancellation effect; generating a power control command based on a comparison between the target value and the signal-to-interference power ratio of the reception signal which is currently being received; and transmitting the power control command to the mobile station to control the transmission power of the mobile station.

According to the present invention, in a CDMA system having power control and interference cancellation capabilities, the power control target values are set based both on values reflecting the interference cancellation effect due to the interference canceling units in addition to values set by the outer loop as conventional. Additionally, the determination of the power control command information is performed by first estimating the post-interference cancellation signal-to-interference power ratio of the current received signal, and then using this value. Consequently, the power control system reflects the effect of the interference cancellation function. Furthermore, this power control system has a fast response with respect to changes on the radio communication path in comparison to conventional power control systems. As a result, unnecessary increases in the transmission power of the uplink can be avoided, thus stressing multiple access interference as compared with conventional systems.

DETAILED DESCRIPTION OF THE INVENTION

Here, the present invention shall be described with reference to the attached drawings. While a W-CDMA signal format is used as an example in the following description, the present invention shall not be construed as being so restricted.

Figure 1:
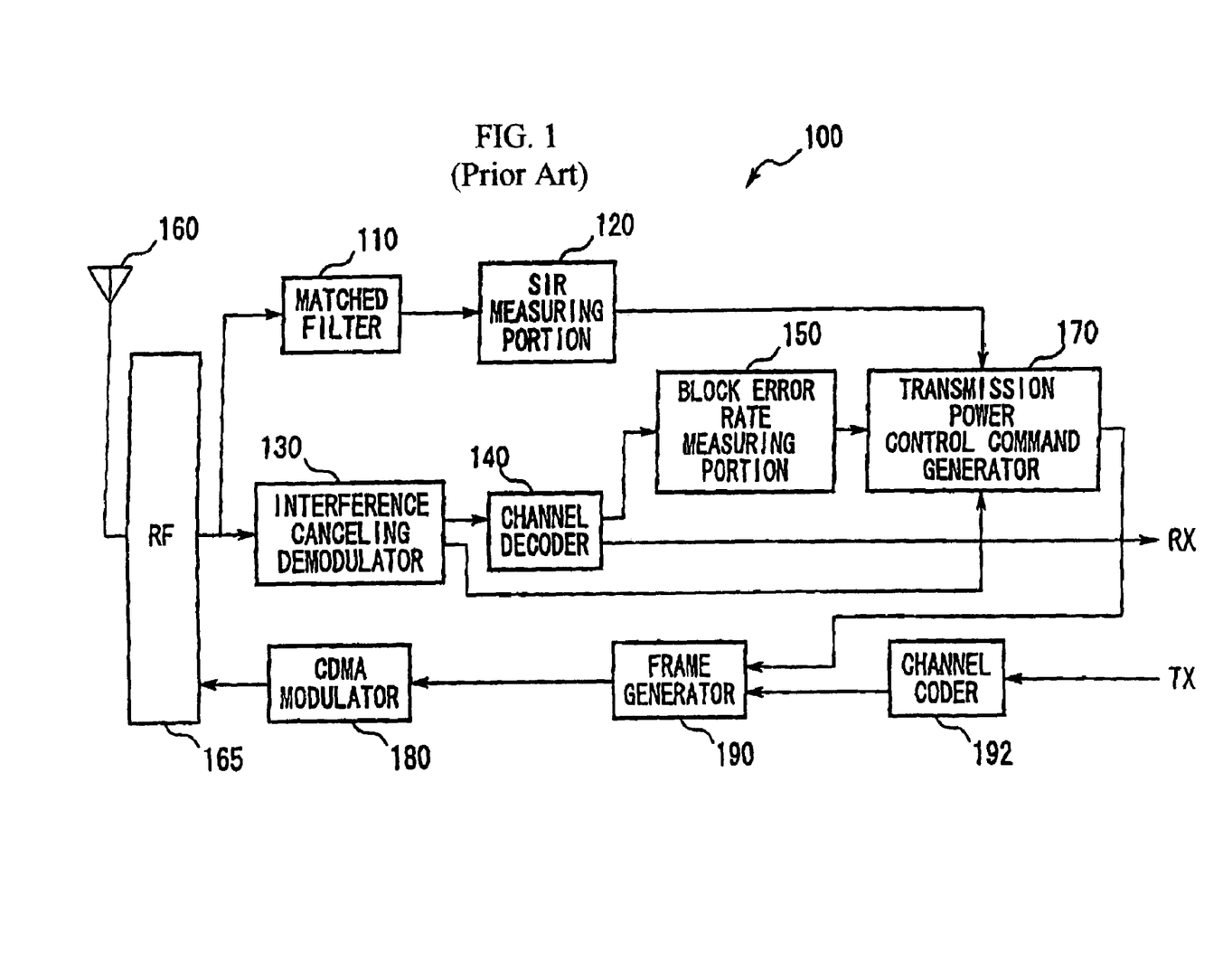
FIG. 1 is a drawing showing a conventional CDMA receiving apparatus.
Figure 2:
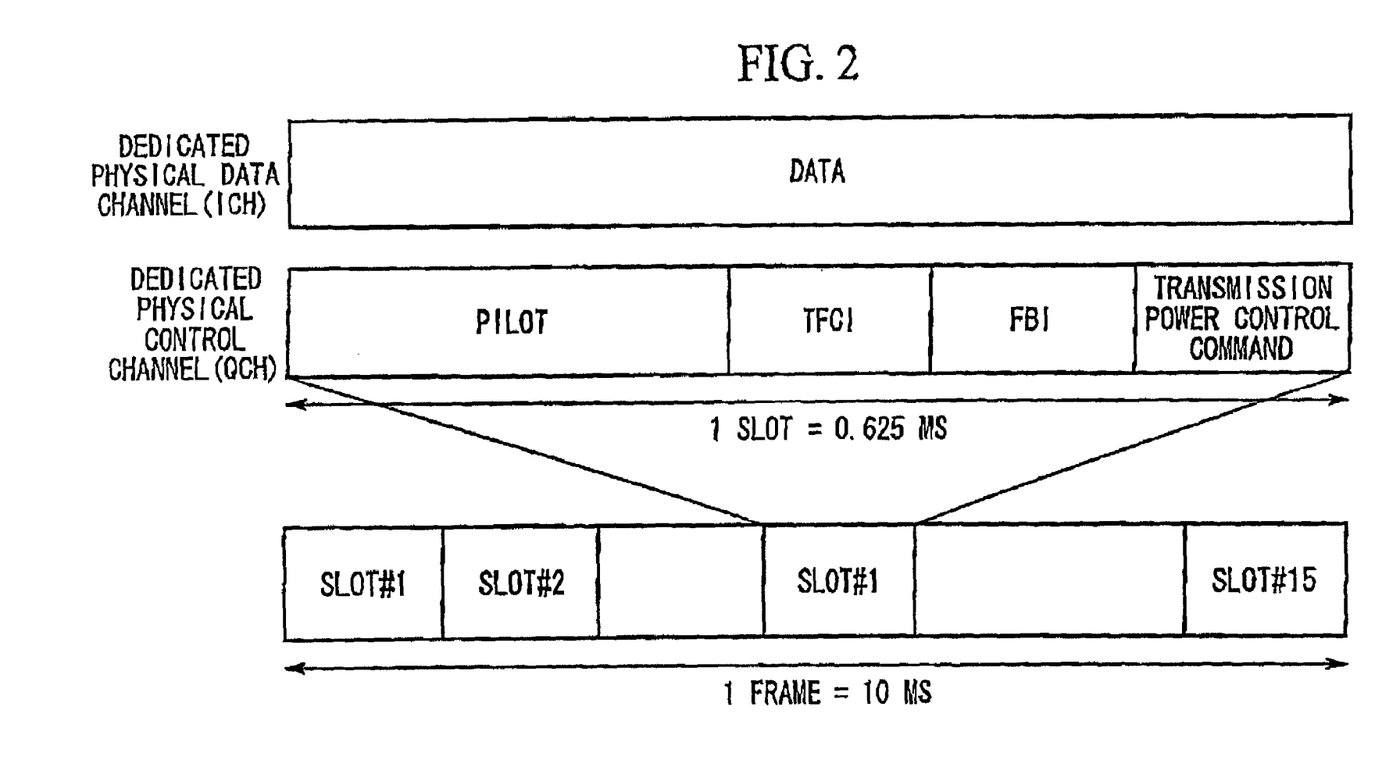
FIG. 2 shows the frame structure of a dedicated physical data channel/dedicated physical control channel of an uplink.

FIG. 1 shows an example of the structure of a base station 100 provided with an interference canceller, for performing power control. In FIG. 1, a single antenna 160 is shown along with an interference canceller corresponding to that single antenna in order to simplify the structure, but the present invention is also applicable to array antennas, and array antennas are in fact more commonly used. FIG. 2 is a diagram showing the frame structure of an uplink in which a dedicated physical data channel and a dedicated physical control channel are I/Q multiplexed.

The procedure for processing received signals shall be explained with reference to FIG. 1. A signal received by the antenna 160 passes through a high-frequency radio portion (RF) 165 and is supplied to a matched filter (MF) 110 and an interference canceling demodulator 130. The received signal is first despread by the despreading code of the dedicated physical control channel in the matched filter 110 to obtain a synchronization timing. While the detailed description shall be omitted here, a plurality of users (user number K) are actually accommodated, so that this synchronization timing acquiring process is performed for K channels corresponding to the respective users.

Using the results of the matched filter 110, the SIR values are determined in real-time by the dedicated physical control channels in the SIR measuring portion 120. Then, the measured SIR values are transmitted to the transmission power control command generator 170.

In the present embodiment, the interference canceling demodulator 130 despreads and demodulates both the dedicated physical data channel and dedicated physical control channel using an interference canceling capability. The interference canceling demodulator 130 outputs SIR values and interference-cancelled demodulated signals for K channels with respect to K users. Here, the SIR values are measured for each interference canceling unit of each stage as shall be explained in detail in FIG. 3. With regard to SIR measurements, they are measured on the basis of the dedicated physical control channel for each user.

The demodulated signal is transmitted to the communication path decoder 140 for each user, where rate de-matching, de-interleaving, channel decoding and cyclic redundancy checks are performed for each user. Using the results of the cyclic redundancy check, a block error rate is measured in units of transmission time interval TTI with respect to the decoded data for each user in the block error rate measuring portion 150, and the block error rate is sent to the transmission power control command generator 170. The SIR information measured at each stage of the interference canceling unit 130 is supplied to the transmission power control command generator 170 which receives the values of the block error rate as described above.

In the transmission power control command generator 170, the SIR information of each stage supplied from the interference canceling demodulator 130, the block error rate supplied from the block error rate measuring portion 150 and the real-time SIR values of the dedicated physical control channels supplied from the SIR measuring portion 120 are used to generate transmission power control commands for the uplinks with respect to each user.

The generated transmission power control commands of the uplinks are sent to the frame (slot) generator 190 for each user, where they are multiplexed with coded signals by a channel coder 192 by being inserted at suitable positions in the transmission slot, and after being modulated by the CDMA modulator 180, are transmitted through the antenna 160 to the respective mobile stations as downlink transmission signals.

FIG. 2 shows the frame structure of a dedicated physical data channel and a dedicated physical control channel in the uplink. Whereas the dedicated physical data channel on the I channel is composed of only data, the dedicated physical control channel on the Q channel is composed, e.g. 10 ms-long frames having 15 slots (slot #1, slot #2, . . . , slot #i, . . . , slot #15), each 0.625 ms-long slot being composed of a channel estimation pilot signal, a TFCI (transport format combination indicator), FBI (feedback information) and a transmission power control command (TPC).

Figure 3:
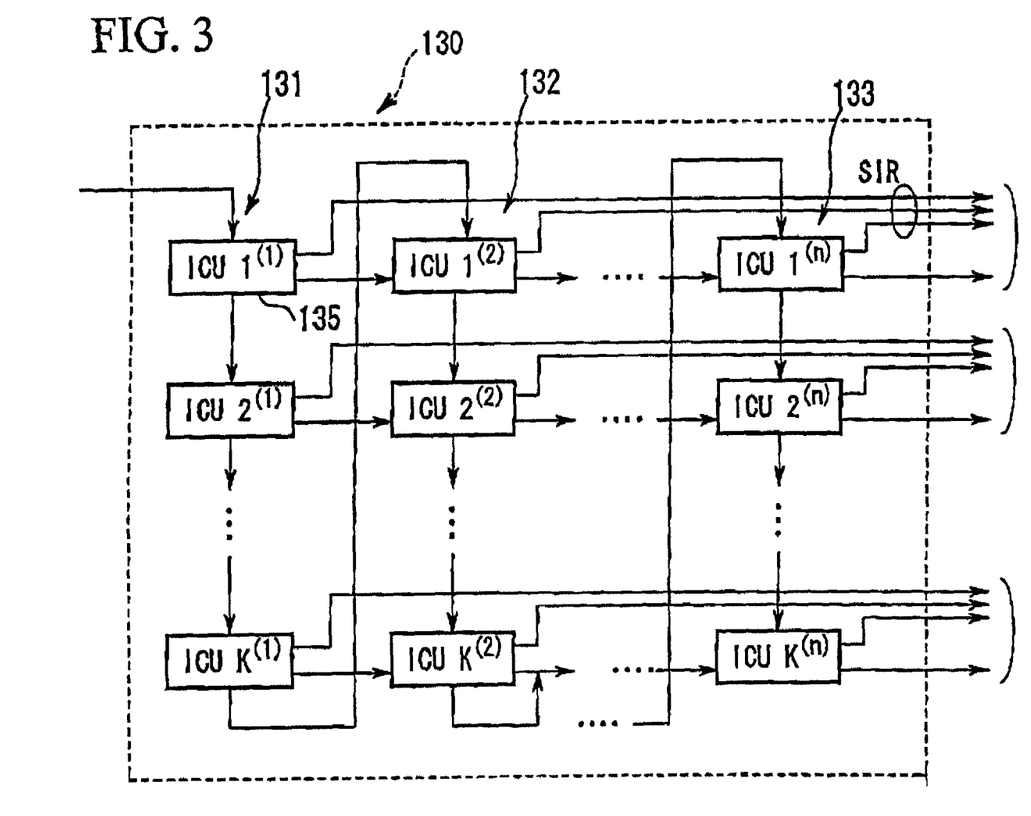
FIG. 3 shows the structure of a multi-stage sequential interference canceling demodulator.

FIG. 3 shows an example of an interference canceling demodulator 130. In this example, a multi-stage (n-stage) serial subtractive interference canceller is shown, but it is also just as possible to use other types of interference cancellers such as multi-stage parallel subtractive type interference cancellers in the present invention.

In the drawing, from left to right in a horizontal direction, there is a total of K interference canceling units 135 corresponding to each channel, in other words, to each user, for each stage from a first stage to an n-th stage. In each stage 131, 132 and 133, the operations of the interference canceling units 135 are performed consecutively. For example, the interference canceling unit 135 for channel j in stage i receives a respread replica signal from channel j of the (i−1)-th stage and a residual signal after an interference canceling operation to channel j−1 in the i-th stage, performs despreading, channel estimation, channel correction and detection, and respreading to generate a respread replica signal which is outputted to channel j of the (i+1)-th stage, performs an interference canceling operation by subtracting this respread replica signal from a residual signal received from channel j−1, then sends the residual signal after the interference canceling operation to the next channel j+1. Additionally, the interference canceling unit 135 of channel j of the i-th stage simultaneously measures the SIR value for channel j of the i-th stage, which is then sent to the transmission power control command generator 170.

Figure 4:
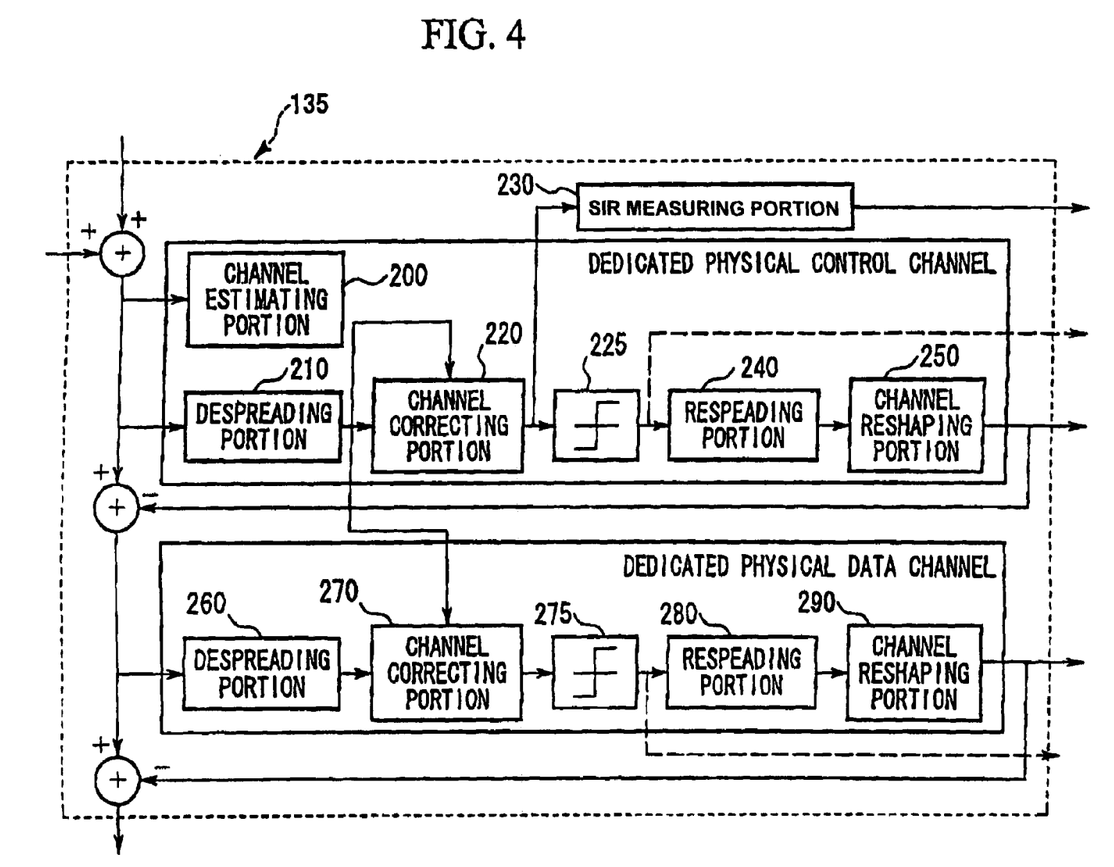
FIG. 4 shows the structure of an interference canceling unit of a multi-stage serial interference canceller.

An example of the structure of each interference canceling unit 135 is shown in FIG. 4. The interference canceling units 135 of the present embodiment are composed of a portion corresponding to the dedicated physical control channel and a portion corresponding to the dedicated physical data channel, and as is clear from FIG. 4, these have roughly identical structures and perform the same operations. Explaining the operations taking as an example the portion corresponding to the dedicated physical control channel, the input signal caused by the received signal is inputted to the channel estimating portion 200 and the despreading portion 210. In the interference canceling units of the second and subsequent stages, a signal obtained by adding the respread replica signal received from the previous stage to the residual signal received from the previous stage or previous channel is inputted to the channel estimating portion 200 and the despreading portion 210.

The channel estimating portion 200 estimates the fluctuations (of amplitude and phase) occurring on the transmission path of the channel, and sends the results of the estimate to the channel correcting portion 220. The despreading portion 210 despreads the input signal using the despreading code of that channel, and outputs the resulting demodulated signal to the channel correcting portion 220. The channel correcting portion 220 adds corrections to the demodulated signal based on the results of the channel estimates so as to cancel out the channel fluctuations received on the transmission path, and outputs the result to the SIR measuring portion 230 and the detector (symbol determining portion) 225.

The detector (symbol determining portion) 225 determines the received symbols from the demodulated signal after channel correction, and outputs the results of the determination to the respreading portion 240. In the interference canceling unit 135 of the final stage, as indicated by the dotted line, the determined received symbols are outputted to the channel decoder 140. At the respreading portion 240, the received symbols are respread using the same spreading codes as used for despreading, and at the channel reshaping portion 250, the opposite of the channel correction performed in the channel correcting portion 220 is performed on the respread signal, as a result of which a respread replica signal which is the replica of the spread signal on that channel is generated. At the interference canceling unit 135, an interference canceling operation is performed by subtracting this respread replica signal from the input signal. The signal which has undergone an interference canceling operation of the dedicated physical control channel is next inputted to a processing unit for the dedicated physical data channel, and an interference canceling operation is performed in a similar manner.

For the present example, a case has been explained wherein the processing unit for the dedicated physical control channel and the processing unit for the dedicated physical data channel are connected serially, but the present invention is also applicable to cases where these processing units have a parallel connection as well.

On the other hand, the SIR measuring portion 230 measures SIR values based on demodulated signals received from the channel correcting portion 220 of the dedicated physical control channel.

While not shown in FIG. 4 for the purpose of convenience of explanation, the demodulating process for the dedicated physical control channel and the dedicated physical data channel may be performed by applying a RAKE receiving system which separates and combines multiple transmission paths.

Figure 5:
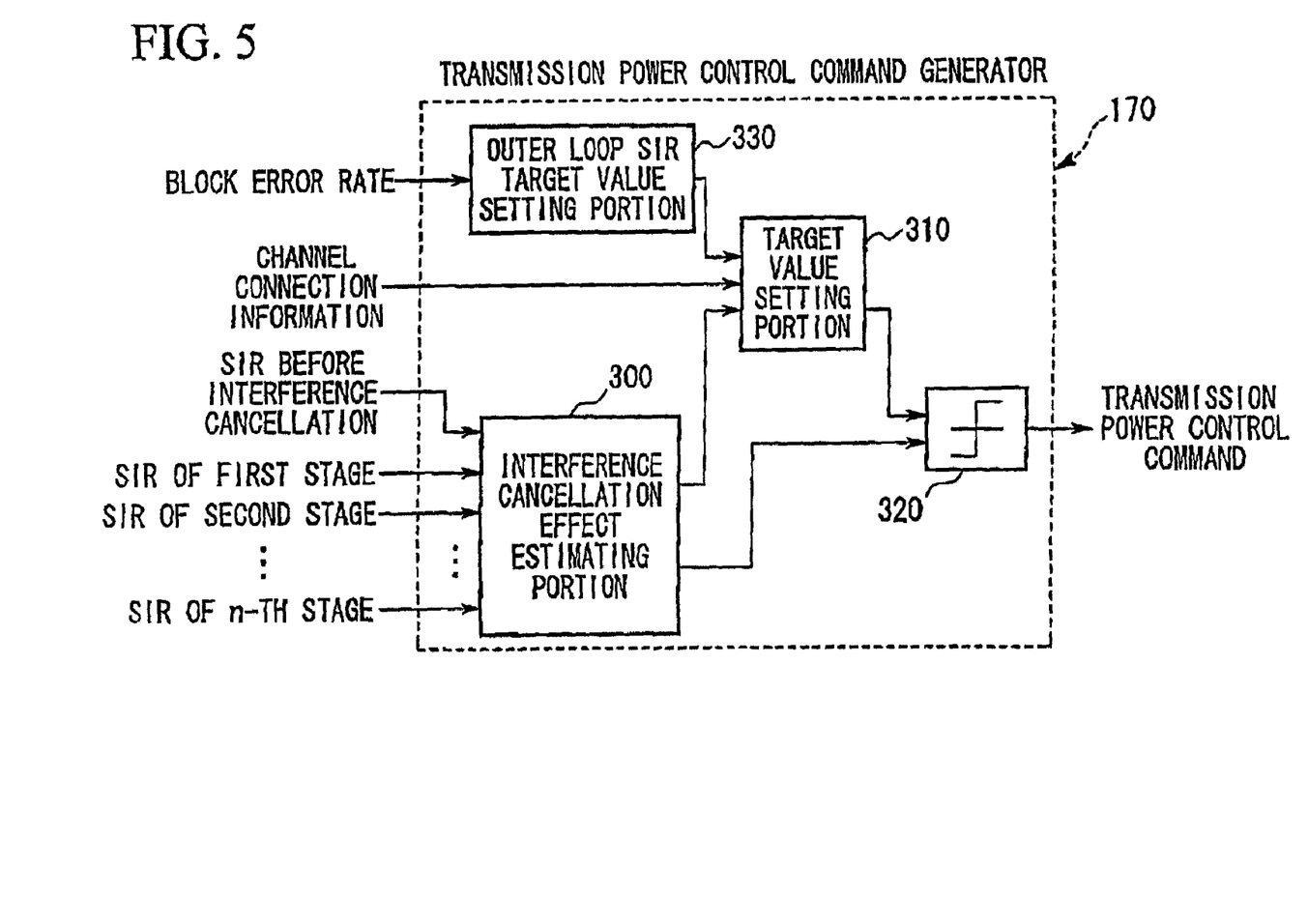
FIG. 5 shows the structure of a transmission power control command generator.
Figure 6:
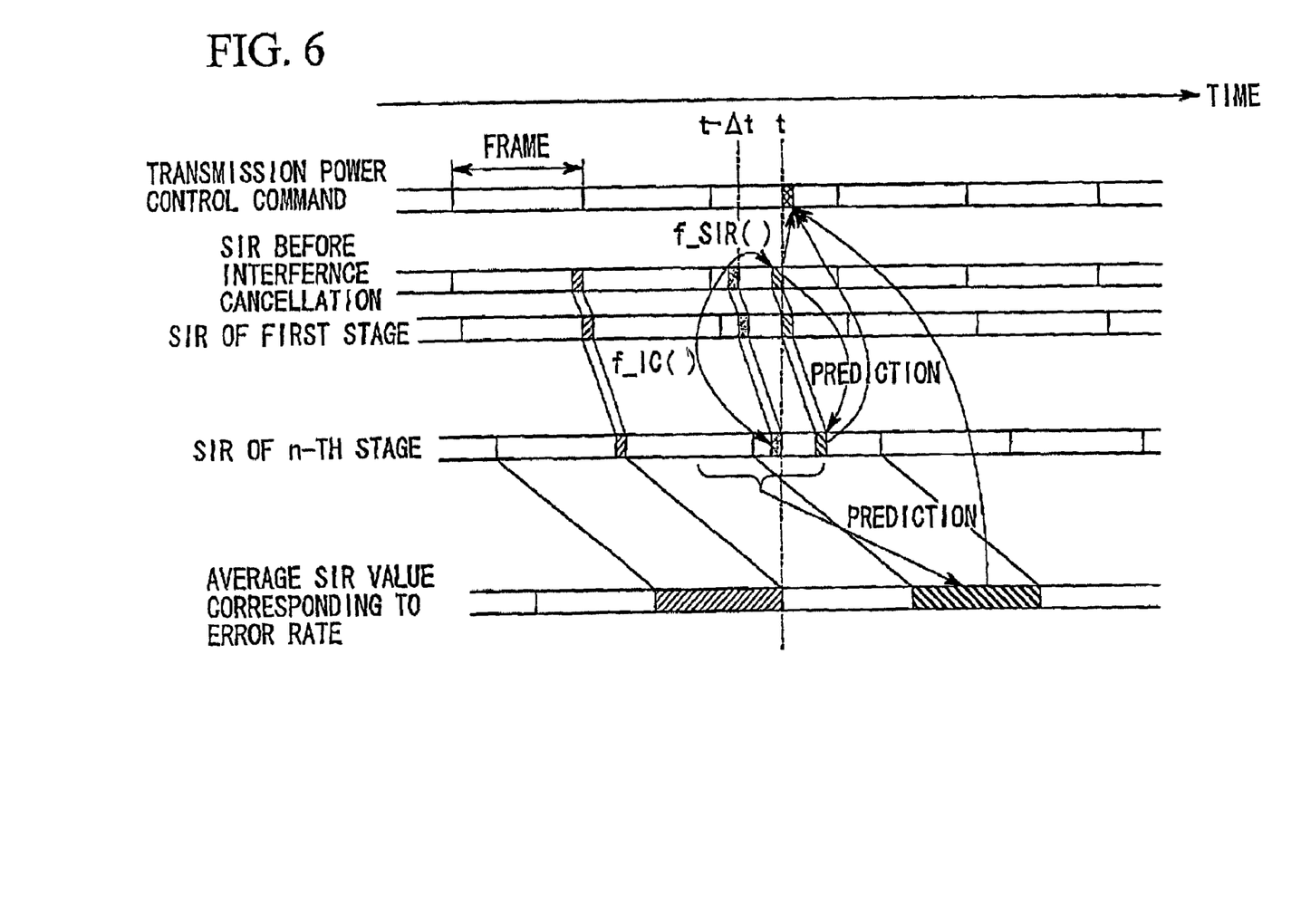
FIG. 6 shows the operation timing of a transmission power control command generator.

FIG. 5 and FIG. 6 respectively show an example of the structure of the transmission power control command generator 170 and the timings for the operation thereof. FIG. 5 shows the structure for a single user, and in actuality, there are as many parts having the same structure as there are users K in the transmission power control command generator 170, to generate transmission power commands for each user.

The SIR values which are supplied from the interference canceling units 135 of each stage of the interference canceling demodulator 130, along with the pre-cancellation SIR values supplied from the SIR measuring portion 120, are inputted to the interference cancellation effect estimating portion 300. The interference cancellation effect estimating portion 300 stores the inputted information, estimates post-interference cancellation SIR values for the current received signals prior to interference cancellation using an algorithm to be described later on the information it currently holds, and outputs the estimated values (hereinafter referred to as SIR estimates) to the comparator 320. In this case, the outputted estimates are SIR values which will presumably be obtained after passing through the interference canceling units of the n-th stage.

Additionally, the interference cancellation effect estimating portion 300 estimates an average signal-to-interference power ratio (hereinafter referred to as average estimated SIR value) with respect to the current received signal based on the SIR values actually measured after interference cancellation already acquired from the interference canceling demodulator 130 and SIR values obtained by the above-described estimate, and outputs the result to the target value setting portion 310. This average estimated SIR value corresponds to the block error rate of the transmission time interval TTI in which the current received signal is contained.

The outer loop SIR target value setting portion 330 has the same function as that of setting the SIR target value which is the reference when generating a transmission power control command in a conventional system, and tentatively determines SIR target values based on the block error rate supplied from the block error rate measuring portion 150. Since this decision making process is the same as the outer loop system of conventional transmission power control methods, its detailed description shall be omitted here, but put simply, the algorithm is such as to set the SIR target value high if the block error rate is high, and to set the SIR target value low if the block error rate is low, a computation method of which may involve prestoring a correspondence table between block error rates and SIR target values, and reading out the SIR target values corresponding to the inputted block error rates.

The target value setting portion 310 uses the tentative SIR target value acquired from the outer loop SIR target value setting portion 330 and the average estimated SIR value of the transmission time interval TTI in which the current pre-interference cancellation received signal is contained to update the target SIR value for power control when, for example, the difference therebetween is larger than a threshold value. At this time, information indicating how many mobile stations are currently connected (channel connection information) can be used as auxiliary information. As the updating algorithm, a method of simply replacing with the estimated average SIR value as the updated value, a method of taking the product of a first coefficient responsive to the average estimate SIR value and a second coefficient responsive to the channel connection information with the tentative SIR target value as the updated value, or a method of taking a value obtained by inputting the average estimated SIR value, the channel correction information and tentative SIR target value to a predetermined function as the updated value may be conceivably used. Additionally, if the difference between the tentative SIR target value and the average estimated SIR value is smaller than the threshold value, the target value setting portion 310 determines that correction of the target value is not required, and outputs the tentative SIR target value as is.

The comparator 320 compares the SIR target value for the power control obtained from the target value setting portion 310 and the post-interference cancellation estimated SIR value estimated for the pre-interference cancellation received signal currently received, and based on the results of the comparison, generates a transmission power command indicating transmission power up or down, and transmits it through the frame generator 190 to the mobile station.

As is clear from the above, the controlled change in the transmission power based on the estimated SIR value considering interference cancellation effects replaces conventional inner loop control, while the setting and updating of the SIR target value for control using the average estimated SIR value corresponding to the block error rate in consideration of the interference cancellation effect corresponds to the conventional outer loop control.

Here, the algorithm for estimating the post-interference cancellation SIR with respect to the current received signal performed in the interference cancellation effect estimating portion 300 and the algorithm for computing the average estimated SIR value corresponding to the error rate relating to the current received signal shall be explained using FIG. 6.

In the SIR measuring portion 120, the SIR values of the received signals are measured in real-time, so that the interference cancellation effect estimating portion 300 can easily obtain a pre-interference cancellation SIR value of the received signal received at the time t. However, since some time is required for the interference cancellation, it is impossible to obtain at the time t the actual measurements of the post-interference cancellation SIR value of the received signal received at the time t.

However, even at the time t, it is of course possible to obtain actual measurements of the post-interference cancellation SIR value of a received signal received in the past. For example, if the delay time required for an n-stage interference cancellation operation is taken as $\tau t$, then the post-interference cancellation SIR value for the n-th stage can be obtained for a received signal received at the time $t-\tau t$. Accordingly, it is possible to estimate how much the SIR value has improved due to the interference cancellation by using the pre-interference cancellation SIR values and the actually measured post-interference cancellation SIR values relating to past received signals, whereby it is possible to obtain a function $f\_IC(\ )$ representing the effect of the interference cancellation. This function $f\_IC(\ )$ indicates the relationship between a signal-to-interference power ratio $SIR\_0(\tau)$ of a signal received at the time $\tau$ and the signal-to-interference power ratio $SIR\_n(\tau)$ after the n-th stage interference cancellation of the same received signal, this being expressible as $SIR\_n(\tau)=f\_IC(SIR\_0(\tau))$. Thus, at the current time t, it is possible to obtain an estimated SIR value as $SIR\_n(t)=f\_IC(SIR\_0(t))$. When determining this function $f\_IC(\ )$, it is possible to use the post-interference cancellation SIR values of each of a plurality of stages (or all stages), or to use the post-interference cancellation SIR values of a specified n-th stage (for example, the final stage).

Additionally, with regard to the pre-interference cancellation SIR value, values up to the time t have been obtained. Therefore, it is also possible to obtain the function $f\_SIRt(k, \tau 2-\tau 1)$ which expresses the change in the SIR value in the k-th stage due to the time change from the time $\tau 2$ to the time $\tau 1$. For example, at the current time t, it is possible to readily determine $f\_SIRt(0, t-\tau t)$ from actually measured values. Furthermore, it is possible to obtain a function $F\_IC_0$ expressing the interference cancellation effect considering the time-varying element based on these functions $f\_IC_0$ and $f\_SIRt_0$.

The interference cancellation effect estimating portion 300 inputs the pre-interference cancellation SIR value for the time t into this interference cancellation effect function $F\_IC_0$, and estimates the post-interference cancellation SIR value of the received signal received at the time t. Consequently, it is possible to obtain at the time t the post-interference cancellation SIR value of he received signal received at the time t without having to wait for the processing delay of the interference cancellation operation.

Additionally, as is clear from FIG. 6, SIR values after n-stage interference cancellation are obtained as the actually measured values with respect to the received signals received until the time $t-\tau t$. Furthermore, due to the above-described estimation SIR values after n-stage interference cancellation are obtained as the estimated values with respect to the received signals received from the time $t-\tau t$ to the time t. The interference cancellation effect estimating portion 300 uses the post-interference cancellation estimated SIR value for the signal received at the time t and the post-interference cancellation SIR value up to a predetermined time prior to then to determine the post-interference cancellation average estimated SIR value, takes this as the average estimated SIR value of the transmission time interval TTI in which the received signal received at the time t is contained, and outputs this to the target value setting portion 310. As mentioned above, this average estimated SIR value corresponds to the block error rate of the transmission time interval TTI in which the received signal received at the time t is contained. While the example described here is one wherein the post-interference cancellation SIR value for the received signal received at the time t and the average estimated SIR value calculated based on the estimated SIR value are taken as the average estimated SIR value of the transmission time interval TTI in which the received signal received at the time t is contained, but as with the above-described SIR estimation algorithm, it is also possible to perform corrections taking into account the time varying element of the computed average estimated SIR values.

In this way, the present invention predicts the post-interference cancellation SIR value for the current received signal, and reflects this in the transmission power control, so that transmission power control is performed more precisely than when using the actual values, thus enabling unnecessary increases of the transmission power as occurred conventionally to be avoided before they happen, and enabling real-time transmission power control with a fast response to be performed by absorbing processing delays due to interference cancellation operations. Furthermore, an average estimated SIR value corresponding to the block error rate of the current received signal is determined, and this is reflected in the target value for transmission power control, thus enabling processing delays due to calculation of the block error rate to be absorbed and enabling real-time transmission power control to be performed with a fast response. Since it is thus possible in the present invention to effectively perform the conventional outer loop and inner loop control in a system using interference cancellers without changing the existing outer loop control signal generating portion, the adaptability to systems with standard specifications can be considered to be high.

In the above-described embodiment, only a serial interference canceller structure is shown in the drawings, but the present invention is also applicable to parallel interference cancellers or serial-parallel hybrid interference canceller structures.

Additionally, in the above-described embodiment, an average estimated SIR value corresponding to the block error rate taking into account the interference cancellation effect for the current received signal is estimated, this value is reflected in the target SIR value and corrected, and the transmission power control command is determined based on the instantaneous SIR value taking into account the interference cancellation effect on the current received signal and the corrected target SIR value, but the present invention is based on the generation of a transmission power control command signal for the uplink in consideration of the interference cancellation effect without being affected by delays due to interference cancellation, so that other methods can be conceived for achieving the generation of the transmission power control command. For example, by using an estimated value of the interference canceling effect, it is possible to update the target SIR values every SIR measurement period during control corresponding to the inner loop as well, and to determine the transmission power control command based on the corrected target SIR value and the SIR value of the current received signal. Furthermore, the target SIR value correcting method corresponding to the outer loop can be such as to estimate the post-interference cancellation block error rate itself and performed on the basis thereof. In either case, the effects indicated below are similar.

What is claimed is:

1. A communication system for performing code-division multiple access communications between a mobile station and a base station wherein;

said base station comprises:

base station receiving means for receiving signals from said mobile station and outputting a first reception signal;

interference canceling means for canceling a multiple access interference signal contained in said first reception signal;

interference cancellation effect estimating means for estimating a post-interference cancellation signal-to-interference power ratio of said first reception signal which is currently being received;

first signal-to-interference power ratio measuring means for determining the signal-to-interference power ratio of said first reception signal;

second signal-to-interference power ratio measuring means for determining the signal-to-interference power ratio of said first reception signal after interference cancellation by said interference canceling means;

wherein said interference cancellation effect estimating means estimates the post-interference cancellation signal-to-interference power ratio for a current reception signal based on the signal-to-interference power ratio of the current reception signal obtained from said first signal-to-interference power ratio measuring means and the post-interference cancellation signal-to-interference power ratio for said first reception signal obtained from said second signal-to-interference power ratio measuring means;

control command generating means for generating a power control command by comparing said post-interference cancellation signal-to-interference power ratio determined by said interference cancellation effect estimating means with a target value for power control; and base station transmitting means for transmitting said power control command to said mobile station; and said mobile station comprises;

mobile station receiving means for receiving a signal from said base station and outputting a second reception signal; and mobile station transmitting means which adjusts the power of a transmission signal transmitted to said base station based on said power control command contained in said second reception signal.

2. A communication system in accordance with claim 1, wherein said target value is determined based on an error rate of decoded data obtained by decoding said first reception signal after interference cancellation by said interference canceling means.

3. A communication system in accordance with claim 1, wherein said base station further comprises signal processing means for determining an average value of signal-to-interference power ratios corresponding to an error rate of the current reception signal based on the post-interference cancellation signal-to-interference power ratio of the current reception signal estimated by said interference cancellation effect estimating means and the post-interference cancellation signal-to-interference power ratio measured by said second signal-to-interference power ratio measuring means; and target value setting means for updating the target value for power control based on said average value determined by said signal processing means.

4. A communication system in accordance with claim 3, wherein said target value setting means updates said target value by taking into account a current number of connections.

5. A base station device for a communication system for performing communications with a mobile station by code-division multiple access; comprising:

base station receiving means for receiving signals from said mobile station and outputting a reception signal;

interference canceling means for canceling a multiple access interference signal contained in said reception signal;

interference cancellation effect estimating means for estimating a post-interference cancellation signal-to-interference power ratio of said reception signal which is currently being received;

first signal-to-interference power ratio measuring means for determining the signal-to-interference power ratio of said reception signal; and second signal-to-interference power ratio measuring means for determining the signal-to-interference power ratio of said reception signal after interference cancellation by said interference canceling means;

wherein said interference cancellation effect estimating means estimates the post-interference cancellation signal-to-interference power ratio of the current reception signal based on the signal-to-interference power ratio of the current reception obtained by said first signal-to-interference power ratio measuring means and the post-interference cancellation signal-to-interference power ratio of a prior reception signal obtained by said second signal-to-interference power ratio measuring means;

control command generating means for generating a power control command by comparing said post-interference cancellation signal-to-interference power ratio determined by said interference cancellation effect estimating means with a target value for power control; and base station transmitting means for transmitting said power control command to said mobile station.

6. A base station device in accordance with claim 5, wherein said target value is determined based on the error rate of decoded data obtained by decoding said reception signal after interference cancellation by said interference canceling means.

7. A base station device in accordance with claim 5, further comprising:

signal processing means for determining an average value for signal-to-interference power ratios corresponding to the error rate of the current reception signal based on the post-interference cancellation signal-to-interference power ratio of the current reception signal estimated by said interference cancellation effect estimating means and the post-interference cancellation signal-to-interference power ratio measured by said second signal-to-interference power ratio measuring means; and target value setting means for updating the target value for said power control based on said average value determined by said signal processing means.

8. A base station device in accordance with claim 7, where said target value setting means updates said target value by taking into account a current number of connections.

9. A power control method in a communication system for performing communications by code-division multiple access between a mobile station and a base station; comprising steps of:

canceling a multiple access interference signal contained in a reception signal from said mobile station;

estimating a post-interference cancellation signal-to-interference power ratio of said reception signal which is currently being received;

measuring the signal-to-interference power ratio of said reception signal and measuring the signal-to-interference power ratio of said reception signal after said canceling step, and estimating the post-interference cancellation signal-to-interference power ratio of the current reception signal based on a resulting signal-to-interference power ratio of the current reception signal and the post-interference cancellation signal-to-interference power ratio of a prior reception signal;

generating a power control command by comparing said estimated post-interference cancellation signal-to-interference power ratio and a target value for power control; and controlling the transmission power of said mobile station by transmitting said power control command to said mobile station.

10. A power control method in accordance with claim 9, wherein said target value is determined based on the error rate of decoded data obtained by decoding said reception signal after said canceling step.

11. A power control method in accordance with claim 9, further comprising:

determining an average value of the signal-to-interference power ratio corresponding to the error rate of the current reception signal based on the post-interference cancellation signal-to-interference power ratio of the current reception signal which has been estimate and the post-interference cancellation signal-to-interference power ratio of the prior reception signal, and updating the target value for said power control based on said average value.

12. A power control method in accordance with claim 11, wherein said target value is updated by taking into account a current number of connections.

* * * * *

UNITED STATES PATENT AND TRADEMARK OFFICE
CERTIFICATE OF CORRECTION

PATENT NO. : 6,961,362 B2
APPLICATION NO. : 09/892459
DATED : November 1, 2005
INVENTOR(S) : Masayuki Ariyoshi et al.

It is certified that error appears in the above-identified patent and that said Letters Patent is hereby corrected as shown below:

In Column 2, Line 44, after "offer" insert -- a --.

In Column 2, Line 45, insert -- power -- before "control".

In Column 3, Line 36, delete "transmission" and insert -- transmitting--, therefor.

In Column 5, Line 2, delete "stressing" and insert -- suppressing--, therefor.

In Column 9, Line 2, delete "correction" and insert -- connection--, therefor.

In Column 9, Line 55, delete "f_IC( )" and insert -- f_IC0--, therefor.

In Column 9, Line 56, delete "f_IC( )" and insert -- f_IC0--, therefor.

In Column 9, Line 64, delete "f_IC( )" and insert -- f_IC0--, therefor.

In Column 10, Line 8, delete "F_IC$_0$" and insert -- f_IC0--, therefor.

In Column 10, Line 10, delete "f_IC$_0$" and insert -- f_IC0--, therefor.

In Column 10, Line 11, delete "f_SIRt$_0$" and insert -- f_SIRt0 --, therefor.

In Column 10, Line 15, delete "F_IC$_0$" and insert -- F_IC0--, therefor.

In Column 14, Line 30, in Claim 11, delete "estimate" and insert -- estimated --, therefor.

Signed and Sealed this

Twentieth Day of November, 2007

JON W. DUDAS
*Director of the United States Patent and Trademark Office*